MULTI-ELEMENT MAGNETIC TRANSDUCER

Filed Jan. 22, 1962 2 Sheets-Sheet 1

INVENTOR.
JACOB J. HAGOPIAN
BY Walter J. Madden Jr.
ATTORNEY

Dec. 1, 1964 J. J. HAGOPIAN 3,159,822

MULTI-ELEMENT MAGNETIC TRANSDUCER

Filed Jan. 22, 1962 2 Sheets-Sheet 2

United States Patent Office 3,159,822
Patented Dec. 1, 1964

3,159,822
MULTI-ELEMENT MAGNETIC TRANSDUCER

Jacob J. Hagopian, San Jose, Calif., assignor to International Business Machines Corporation, New York, N.Y., a corporation of New York Filed Jan. 22, 1962, Ser. No. 167,753
7 Claims. (Cl. 340—174.1)

This invention relates in general to magnetic transducers and relates more particularly to such transducers having a plurality of writing or recording elements in a single unitary core.

In handling digital information in data processing systems, it is frequently desirable or even necessary to transmit data in serial form, serial transmission meaning that the data is transmitted one bit at a time. Such serial transmission may be necessary for economic reasons to reduce the number of components required by eliminating the parallel channels which would be required for parallel transmission. Similarly, in the case of data transmission with only a single transmission channel available, serial operation is a necessity. The present invention contemplates a magnetic transducer which is adapted to receive parallel inputs and to record these inputs in serial order on a magnetizable member which cooperates with the transducer. In accordance with the teachings of the present invention, the transducer comprises a generally unitary magnetic core structure on which is provided a plurality of separate recording or write windings. Each of these write windings is adapted to receive one of the parallel inputs from the data to be recorded, and to record this input on the cooperating magnetizable member.

In the preferred embodiment of the invention, the pole face structure of the transducer is provided with a plurality of slots which are spaced along the length of the magnetizable member and into which are fitted one or more electrical conductors forming the different write windings. Each of the write windings is adapted to receive an input from one of the parallel inputs to be recorded and to produce on the immediately underlying area of the magnetizable member a magnetic recording pattern corresponding to this input. Each of these slots with its associated conductor or conductors therein acts as a separate recording transducer, thus producing on a single transducer structure the effect of a plurality of individually controllable transducers. By closely spacing the slots into which the conductive windings are fitted, the space between adjacent recording elements can be made much smaller than could be achieved in attempting to align closely spaced individual transducers. Since the slots in the transducer structure are spaced along the length of travel of the magnetizable medium, parallel energization of the windings in the slots results in an effective serial recording of the individual data bits.

In accordance with another feature of the present invention, the same core structure on which is provided a plurality of magnetic writing elements is also provided with at least one reading element for reading out or reproducing the bit pattern produced by the plurality of writing elements. In the preferred embodiment of the present invention, the read portion of the structure includes a read gap which is closely adjacent the plurality of writing elements on the transducer so that a magnetizable medium in passing the transducer is first exposed to the writing elements and then passes the read gap. In operating in this fashion, the bits which had been recorded in parallel are read out in serial fashion as each of the bit patterns passes under the single read gap. By utilizing only a single read gap and associated readout winding, only one playback amplifier channel is required, thus reducing the cost of the equipment considerably.

The structure of the present invention is particularly useful in connection with data transmission systems where each character to be transmitted is represented by a plurality of bits and these characters are to be recorded serially on a recording medium for subsequent delivery to a transmission link or network. Heretofore, data transmission of this nature has been performed by punched or magnetic tapes provided with parallel tracks on which all of the bits for a given character are simultaneously recorded. This is a practical arrangement for punched tape, but in the case of magnetic tape, this parallel track recording necessitates separate playback amplifiers for each channel, as well as a parallel-to-serial converter for delivering the data in serial form to the transmission link. By utilizing the present structure of such an application, the plurality of bits representing a given character may be delivered simultaneously to the plurality of write windings on the core structure. Since the different writing elements are disposed along the length of the record medium, the parallel delivery results in effective serial recording of the bits along the length of the medium, so that subsequent playback of this recording past the single read element will produce a serial readout of the recorded bits, thus facilitating delivery of the bits to the serial transmission channel.

One substantial benefit of the use of the structure of the present invention in this data transmission application is that the current pulses can be supplied to each of the individual writing windings while the record medium is stationary. Thus, the input device, which may be a keyboard or other similar device, can deliver to the multiple recording elements of the magnetic head coded pulses which can be either serial or parallel in time. The recording medium can thus be incrementally displaced at the character rate under control of the keyboard, making possible the use of a slower and simpler record medium stepping mechanism than if a single element record head were used and the medium advanced incrementally at the bit rate. Another advantage of utilizing the multiple element recording head with stationary recording is that the keyboard need not have a serialized output to produce serial-by-bit recording on the medium. Further, by recording the entire character with the medium stationary, the character just recorded can be read out and checked during the displacement of the medium from one character position to the next. An additional advantage of the use of the present structure is that a highly uniform bit rate results from the fact that the multiple recording elements of the magnetic head are accurately spaced from each other during fabrication and that this spacing, once fixed, remains essentially stationary during the use of the device. Thus, the use of a simple detent device on the record medium drive mechanism during recording assures equal spacing between recorded characters.

Objects and advantages other than those set forth above will be readily apparent from the following description when read in connection with the accompanying drawings in which.

Figures 1, 2, 3, 4:
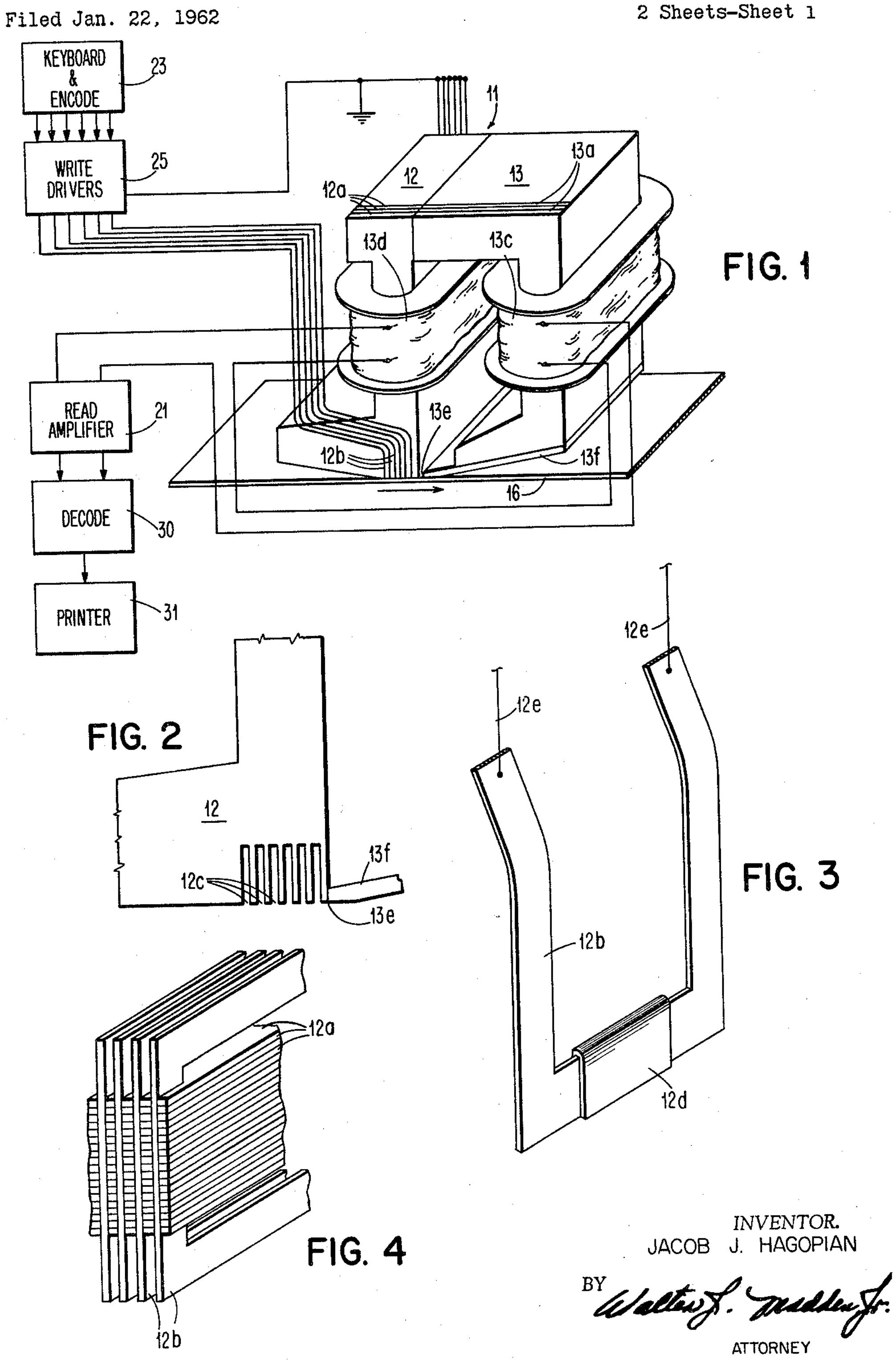
FIG. 1 is a perspective view of the overall magnetic core structure of the present invention employing a plurality of recording elements and a single reading element, together with diagrammatic representations of the circuits associated with these elements.
FIG. 2 is a perspective view on an enlarged scale illustrating the slots in the magnetic core structure into which the write windings are inserted.
FIG. 3 is a perspective view of one form of writing winding particularly useful in the structure shown in FIGS. 1 and 2.
FIG. 4 is a perspective view of the writing portion of the magnetic cores showing single turn write windings inserted in the slots in the core structure.

Referring to FIG. 1 by character of reference, numeral 11 designates generally a core structure forming the device of the present invention. Core 11 may be considered to comprise a writing core structure 12 and a reading core structure 13. The core may be formed of any suitable material and may be a unitary structure such as a ferrite core. Alternatively, the core may, as shown in FIG. 1, comprise a plurality of laminations 12*a*, 13*a*. The writing structure includes a plurality of write windings 12*b* which are closely spaced on the pole face portion of core 12 to form a plurality of separate write elements. As shown in enlarged detail in FIG. 2, the pole tip of write core 12 is preferably provided with a plurality of notches 12*c* into which the individual write conductors 12*b* are placed. One particularly suitable form of write conductor is illustrated in FIG. 3. This conductor 12*b* is in the form of a thin strip of electrically conductive material such as brass, which is formed into the general U-shape shown and placed in one of the slots 12*c*.

The disposition of conductive strips 12*b* in slots 12*c* is shown in FIG. 4. It will be noted that the strips 12*b* extend beyond the edges of the pole face formed by core portion 12. Where core 12 is formed of an electrically conductive material, it is necessary to electrically insulate the conductive strips from the core and from each other. To accomplish this insulation, each of the conductive strips 12*b* may be provided with a collar or jacket 12*d* of electrical insulating material, as shown in FIG. 3, which corresponds in depth to the depth of the pole face and which serves to electrically insulate each of strips 12*b* from the core. The ends of conductive strips 12*b* are electrically connected to electrical conductors 12*e* for supplying current to the strips. Conductors 12*e* are connected to a suitable source of current pulses which are to be magnetically recorded on the magnetizable member which cooperates with transducer 11.

Suitable means are provided on core structure 11 for reading back or reproducing the different signals recorded by the plurality of write conductors 12*b*. Such means may include a pair of coils 13*c*, 13*d* mounted on core portions 12 and 13. These read coils are preferably electrically connected together in push-pull relationship. A reading gap 13*e* is provided in the core structure between one face of core 12 and a shoe member 13*f*. As indicated in FIG. 1, read core 13 is provided with an extending shoe portion 13*f* which magnetically links the laminations 13*a* to the pole face area of core 12. Shoe 13*f* is separated from core 12 by a shim of a suitable non-magnetic material such as brass to form reading gap 13*e*. The structure is preferably formed as shown in FIG. 1, utilizing shoe 13*f* so as to accurately control the height of the reading gap, in a manner to be described more in detail below. The readback signal generated by read coils 13*c*, 13*d* is supplied to suitable reading utilization circuits including a read amplifier 21.

The preferred method of assembling cores 11 may begin with assembling of the laminations 12*a* forming the write core structure 12 and the laminations 13*a* forming read core 13. If notches 12*c* are to be provided by etching, this etching will be performed on the individual laminations prior to their assembly. However, if the notches are to be sawed, the sawing can be performed after assembly of all of the laminations 12*a*. Read coils 13*c*, 13*d* may then be placed on the core structures and conductive strips 12*b* placed in notches 12*c*. After this step, the assemblies are placed together and preferably clamped in position with the shim 13*e* forming the reading gap in place. All electrical leads are then attached to the read and write coils and shoe 13*f* is cemented to the bottom of core 13. As indicated in FIG. 3, conductor strips 12*b* are of sufficient flexibility to permit bending of the upper ends thereof so as to provide sufficient separation between these ends to make electrical connections thereto. With the assembly still clamped, the entire assembly is then potted or encapsulated to form a rigid structure. This potting serves to secure the core elements together and also serves to maintain each of strips 12*b* electrically separate and insulated from the adjacent strips. After this potting step, the entire core assembly 11 may be placed in a suitable housing and potted in place therein in accordance with well known techniques. After this potting in the housing, the surface forming the writing and reading gaps is machined to the desired dimensions and then lapped so as to provide a smooth, uniform pole face along the bottom of the core structure.

As indicated above, one of the particularly advantageous applications of the present invention is in connection with the transfer of information from a device such as a keyboard 23 to the buffer storage represented by magnetizable record member 16. To effect this transfer, the output from keyboard 23 is converted in a well known manner into electrical signals representing the different characters. Preferably, each character from the keyboard is encoded into a unique combination of electrical bits. In the illustrated example, it is assumed that a 6-bit code is utilized, so that the output from keyboard-encoder 23 is a combination of six binary bits representing the different characters from the keyboard. These signals are supplied to a write driver circuit 25 which supplies current pulses to the appropriate ones of the write windings 12*b*.

In operation, when a key on keyboard 23 is actuated, the coded representation of the character corresponding to the actuated key is transmitted to write driver 25 to supply current pulses to the appropriate ones of the conductive strips 12*b*. It will be noted that this input to the conductive strips is parallel in form. In the preferred method of operation, record medium 16 is stationary at the time of writing so that the current pulses supplied to the different write windings 12*b* produce a magnetization along the length of member 16 corresponding to the coded representation of the typed character. After completion of the keyboard actuation and recording of the coded representation of this character on member 16, the record member is advanced to the next character position. During this advance between characters, each of the bits recorded on member 16 passes read gap 13*a* in serial fashion, and in a particularly advantageous method of operation, these bits are read out at this time through read coils 13*c*, 13*d* for verification. In this method of operation, the output signals from coils 13*c*, 13*d* are supplied through read amplifier 21 to a decoding matrix 30 which produces an output representing the decoded character. This output is then supplied to a printing device 31 on which a visual representation of the decoded character is produced thus permitting the operator to visually verify each recorded character as it is typed.

When member 16 has reached a position corresponding to the next character and after completion of the verification readback of the character just recorded, the apparatus is operative to record the next character upon actuation of a key on keyboard 23. The operation thus proceeds to produce a serial-by-bit arrangement of bits on member 16, with a serial readout between characters for verification. Upon completion of typing of the message, member 16 may be subsequently utilized to transmit the characters to a transmission medium such as a single channel transmission line. It will be seen that during this playback or transmission, member 16 may be driven at a suitable speed corresponding to the capability of the transmission line, with the bits read out in serial fashion by read coils 13*c*, 13*d* for transmission to the transmission link. Thus, the device is operative to record, at keyboard speed, the bits in serial order representing the parallel input from keyboard 23 and to play back this bit pattern in serial fashion for transmission at any appropriate speed, with only one playback amplifier channel.

I have built structure as shown in the drawings utilizing slots 12*c* with a width of .006 of an inch, with .0135 inch between slot centers. In these slots I placed conductive strips of brass of a .001 inch thickness and a depth in each leg of .040 of an inch. The jacket member 12*d* was formed of an insulating material of .00025 of an inch thickness, making a total thickness of conductive strip 12*d* and insulating jacket 12*d* of .0015 of an inch. To fill the remaining space in the slot, insulating jacket 12*d* was surrounded by a jacket of high-permeability magnetic material of .002 of an inch thickness in each wall, thus producing approximately .0055 of an inch thickness which formed a satisfactory fit in the .006 of an inch slots 12*c*. After placement of these conductive strips in the slots, electrical connections were made to the ends of the strips and the strips potted as discussed above.

In providing current pulses to the write windings of the dimensions discussed above, I have found that a 4-ampere pulse for each of the conductive strips for a duration of 100 microseconds is sufficient to saturate a magnetic tape in contact with the core without producing any significant interbit interference.

Figure 5:
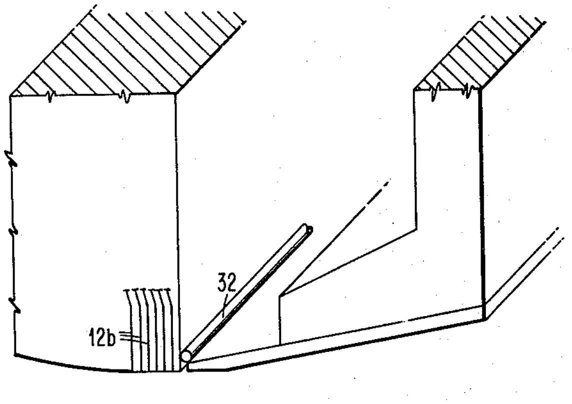
FIGS. 5 and 6 illustrate modifications of the core structure of FIG. 1 to prevent the inducing of large voltages in the read coil when the write windings are energized.

In connection with the embodiment illustrated in FIG. 1, there is the possibility that the write currents may produce voltages in the read winding which may be of significant magnitude. Generally, it is desirable to gate off or block the read amplifier during writing so as to prevent the read coils from producing a large readback signal at this instant. Where it is desirable to prevent this readback signal from saturating or overdriving the readback amplifier so as to retard its ability to immediately read the subsequent data, either of the arrangements illustrated in FIGS. 5 and 6 may be employed to buck out some of the readback flux. In FIG. 5, a conductor 32 is disposed along and immediately above the read gap 13*e*.

Conductor 32 is supplied with the write current pulses so that the current flowing through conductor 32 is the sum of the currents being supplied to the different conductive strips 12*b*. Thus, each time the conductive strips 12*b* are pulsed to write a character, conductor 32 has a similar current flowing therethrough to generate in the read portion of the core an M.M.F. opposing the M.M.F. generated by the write currents. This bucking effect reduces the effective flux which reaches the readback coils 13*c*, 13*d* to thus reduce the voltage generated by these coils upon writing.

Figure 6:
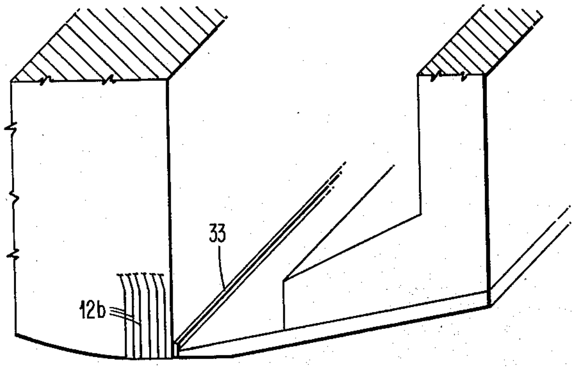

FIG. 6 illustrates an alternative embodiment of the invention in which a member 33 is disposed directly in the read gap 13*e*. Member 33 may be a strip of suitable electrically conductive, non-magnetic material such as brass disposed in the read gap and through which the write current may flow to produce the above described bucking action. The ends of conductive strip 33 are connected in circuit with write driver 25 and conductive strips 12*b* in the manner similar to that shown for conductor 32, to produce at the time of writing a counter M.M.F. in the vicinity of the read gap which bucks out a substantial portion of the M.M.F. generated by the writing currents in strips 12*b*, to thus reduce the voltage generated in read coils 13*c*, 13*d* when writing.

Figure 7:
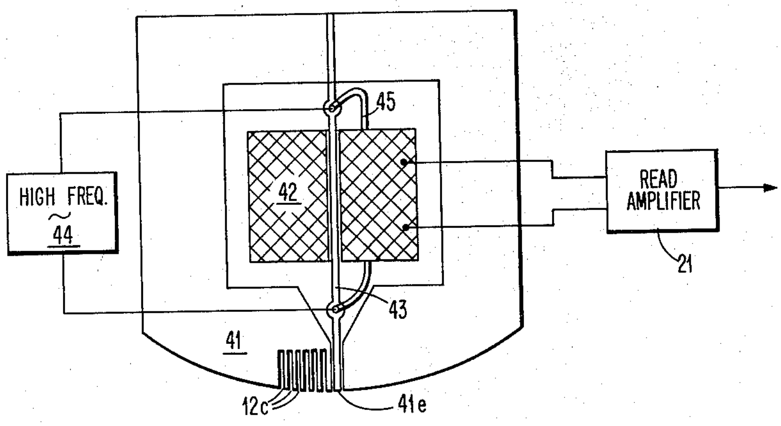
FIG. 7 is an elevational view of a core structure in accordance with the present invention utilizing a flux sensing read element.

FIG. 7 illustrates an alternative embodiment of the present invention which is particularly adapted for use with read-back signals at low speed. In FIG. 7 a magnetic core structure 41 of a high permeability magnetic material is again provided with notches 12*c* into which the conductive strips 12*b* may be fitted to form a plurality of write elements, as discussed above in connection with the other embodiments. The structure is also provided with a read coil 42 which is disposed in a central opening in the core structure and within which is disposed a probe 43 of high permeability magnetic material. A loop of wire 45 extends through probe 43 and around coil 42 as shown. A source of high frequency current 44 is connected to the ends of wire loop 45 to send a current flow through this loop which establishes an alternating magnetic field around the openings in probe 43 through which the exciting loop 45 passes. As is well understood in the art, the read portion of the structure of FIG. 7 is a conventional flux sensing head in which the high frequency magnetic field established by the current flow through loop 45 modulates the flux in the probe element 43 resulting from magnetization of a bit to be read on record medium 16. This modulation of the probe flux induces a voltage in read coil 42 which is supplied to read amplifier 21.

Thus, in the embodiment of FIG. 7, the core structure is utilized as discussed above to perform a writing operation on record medium 16, with conductor strips 12*b* being energized to form a plurality of write elements for producing magnetization of the underlying record member. For reading the bits so written, high frequency source 44 is energized to establish a high frequency magnetic field around the openings in probe member 43 so as to effectively modulate the induced flux due to the magnetic bits on record member 16. This modulation induces a signal in read coil 42 which is supplied to the utilization circuitry including read amplifier 21. The embodiment of FIG. 7 is particularly useful where the signals are to be read back with very low tape speed and where the conventional dynamic read-back apparatus would not be satisfactory. It will be understood that the induced signal in read coil 42 will have twice the frequency of high frequency source 44.

Although several embodiments of the present invention have been illustrated and described, it will be readily apparent to those skilled in the art that various modifications of the present invention may be employed. For example, although the embodiments illustrated utilized ring type heads, it will be appreciated that other types of magnetic recording heads, such as a probe type head, could be utilized with equal effectiveness. Similarly, although single turn write windings were illustrated, it will be understood that multi-turn windings could be utilized satisfactorily. Further, each of the write windings can be provided with a center tap connection so that magnetization of either polarity can be produced on the underlying record member.

While the invention has been particularly shown and described with reference to preferred embodiments thereof, it will be understood by those skilled in the art that various changes in the form and details may be made therein without departing from the spirit and scope of the invention.

What is claimed is:

1. Apparatus for magnetically recording a plurality of signals and for reading back said signals comprising
   a magnetic core structure including a pair of leg portions and a narrow read gap defined thereby,
   a plurality of electrically separate windings in one leg portion of said core structure, said plurality of windings forming separate magnetic recording elements extending parallel to the read gap,
   means for simultaneously supplying a plurality of signals to be recorded to said windings to simultaneously record said signals on a cooperating magnetic record member,
   and a single magnetic reading winding on a leg portion of said core structure for sequentially reproducing the signals recorded by said plurality of recording elements.

2. Apparatus for magnetically recording a plurality of signals and for reading back said signals comprising
   a magnetic core structure including a pair of leg portions and a narrow read gap defined thereby,
   a plurality of electrically separate windings in one leg portion of said core structure, said plurality of windings forming separate magnetic recording elements which are uniformly spaced from each other extending parallel to the read gap, means for supplying a plurality of signals to be recorded to said windings to record said signals on a cooperating magnetic record member, and a magnetic reading winding on a leg portion of said core structure for reproducing the signals recorded by said plurality of recording elements.

3. Apparatus for magnetically recording a plurality of electrical signals and for reproducing said signals comprising a magnetic core structure including a pair of leg portions and a narrow read gap defined thereby, one leg portion having a substantial pole face area, a plurality of closely spaced grooves in said pole face area parallel to said read gap, a plurality of electrical windings disposed in said grooves to form a plurality of separate magnetic recording elements, means for supplying currents to said plurality of windings to produce on a cooperating magnetic medium a plurality of magnetic record patterns, and a reading coil disposed on a leg portion of said core structure for reproducing said magnetically recorded patterns.

4. Apparatus for magnetically recording a plurality of electrical signals and for reproducing said signals comprising a magnetic core structure including a pair of leg portions and a narrow read gap defined thereby, one leg portion having a substantial pole face area, a plurality of closely spaced grooves in said pole face area parallel to said read gap, a plurality of single turn electrical windings disposed in said grooves to form a plurality of separate magnetic recording elements, means for simultaneously supplying currents to said plurality of windings to simultaneously produce on a cooperating magnetic medium a plurality of magnetic record patterns, and a single reading coil disposed on a leg portion of said core structure for sequentially reproducing said magnetically recorded patterns.

5. Apparatus for magnetically recording a plurality of electrical signals and for reproducing said signals comprising a magnetic core structure including a pair of leg portions and a narrow read gap defined thereby, one leg portion having a substantial pole face area, a plurality of closely spaced grooves in said pole face area parallel to said read gap, said grooves being uniformly spaced in a line in said pole face area, a plurality of single turn electrical windings disposed in said grooves to form a plurality of separate magnetic recording elements, means for simultaneously supplying currents to said plurality of windings to simultaneously produce on a cooperating magnetic medium a plurality of uniformly spaced magnetic record patterns, and a reading coil disposed on a leg portion of said core structure for sequentially reproducing said magnetically recorded patterns.

6. Apparatus for magnetically recording a plurality of signals and reading back said signals as set forth in claim 2 including:

a conductor disposed along the read gap and connected to the means for supplying signals so as to buck out any flux in the read gap generated by the write currents.

7. Apparatus for magnetically recording a plurality of electrical signals and for reproducing said signals as set forth in claim 4 including:

a conductor disposed along the read gap and connected to the means for supplying current so as to buck out any flux in the read gap generated by the write currents.

References Cited in the file of this patent

UNITED STATES PATENTS 3,103,665 Martin et al. ----------- Sept. 10, 1963

FOREIGN PATENTS 882,779 Great Britain ---------- Nov. 22, 1961

OTHER REFERENCES

"Multi-Channel Magnetic Recording Head," Thorpe et al., IBM Tech. Dis. Bulletin, vol. 3, No. 10, March 1961.